United States Patent [19]
Brock

[11] 3,774,766
[45] Nov. 27, 1973

[54] AQUARIUM FILTER ASSEMBLY

[76] Inventor: Herbert E. Brock, 121 Harper Ave., Winnipeg, Manitoba, Canada

[22] Filed: Nov. 11, 1971

[21] Appl. No.: 197,732

[52] U.S. Cl. .............................. 210/169, 210/248
[51] Int. Cl. ........................... E04h 3/20, C02b 3/08
[58] Field of Search.................. 210/169, 194, 195, 210/314, 248

[56] References Cited
UNITED STATES PATENTS

| | | | |
|---|---|---|---|
| 3,540,591 | 11/1970 | Yamazaki | 210/169 |
| 3,487,440 | 12/1969 | Newsteder | 210/169 |
| 3,377,991 | 4/1968 | Rubert | 210/169 X |
| 2,653,908 | 9/1953 | Rodda | 210/169 |
| 1,790,947 | 2/1931 | Rabjohn et al. | 210/314 |
| 543,922 | 8/1895 | Buckley | 210/314 X |
| 678,857 | 7/1901 | Betzold | 210/314 X |

Primary Examiner—Samih N. Zaharna
Assistant Examiner—T. A. Granger
Attorney—C. C. Kent et al.

[57] ABSTRACT

The filter assembly has at least two compartments, the first being provided with a drip pan feed and has an unsubmerged filter bed holding "rocksplit" upon which aerobic bacteria are situated. The drip pan controls the rate of flow through the filter bed.

5 Claims, 2 Drawing Figures

INVENTOR.
HERBERT E. BROCK
BY
Kent + Ade

AQUARIUM FILTER ASSEMBLY

BACKGROUND OF THE INVENTION

The majority of aquarium filters are strictly mechanical and after having been in use for some time the filter medium has to be removed and replaced. Not only does this type of filter require constant cleaning and replacement but also it is not entirely satisfactory in operation.

SUMMARY OF THE INVENTION

The present invention overcomes these disadvantages by providing purification by oxidation and the use of aerobic bacteria forming in the filter bed.

It employs the principle of an unsubmerged main filter bed by creating two independent water levels in the one unit. The water is brought into the filter by siphon and may be removed after filtering by air lift or by pumps.

All of the parts are removable for cleaning purposes and the after filter is constructed so that a de-ioniser resin may be used to remove and adjust the mineral or organic compound content of the filtered aquarium water.

The device is readily attached to one side of an aquarium and if made of clear plastic as is preferable, the condition and operation of the filter can be observed at all times.

It incorporates a novel drip-pan flow regulation chamber so that the main unsubmerged filter bed may operate at peak efficiency.

The novel drip-pan operates for longer periods of time, if made of a plastic material that restricts the passage of light to a minimum. By this the formation of algae is hindered and does not restrict the free passage of water through the perforations of the novel drip-pan.

Plastic materials used in the manufacture of the device must be resistant to the acids and chemical reactions that are known to take place in fresh and salt water aquariums, and must be non-toxic to the inhabitants of such aquariums.

In one embodiment the drip pan acts as the pre-filter and is situated above the main filter bed with the after filter being connected to the catch basin portion of the main filter compartment.

In the other embodiment, the pre-filter is separated from the main filter compartment and water is fed from the pre-filter to the drip pan situated within the main compartment.

The device may be used with large or small aquariums and may be used either with an air lift or with a pump depending upon design.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
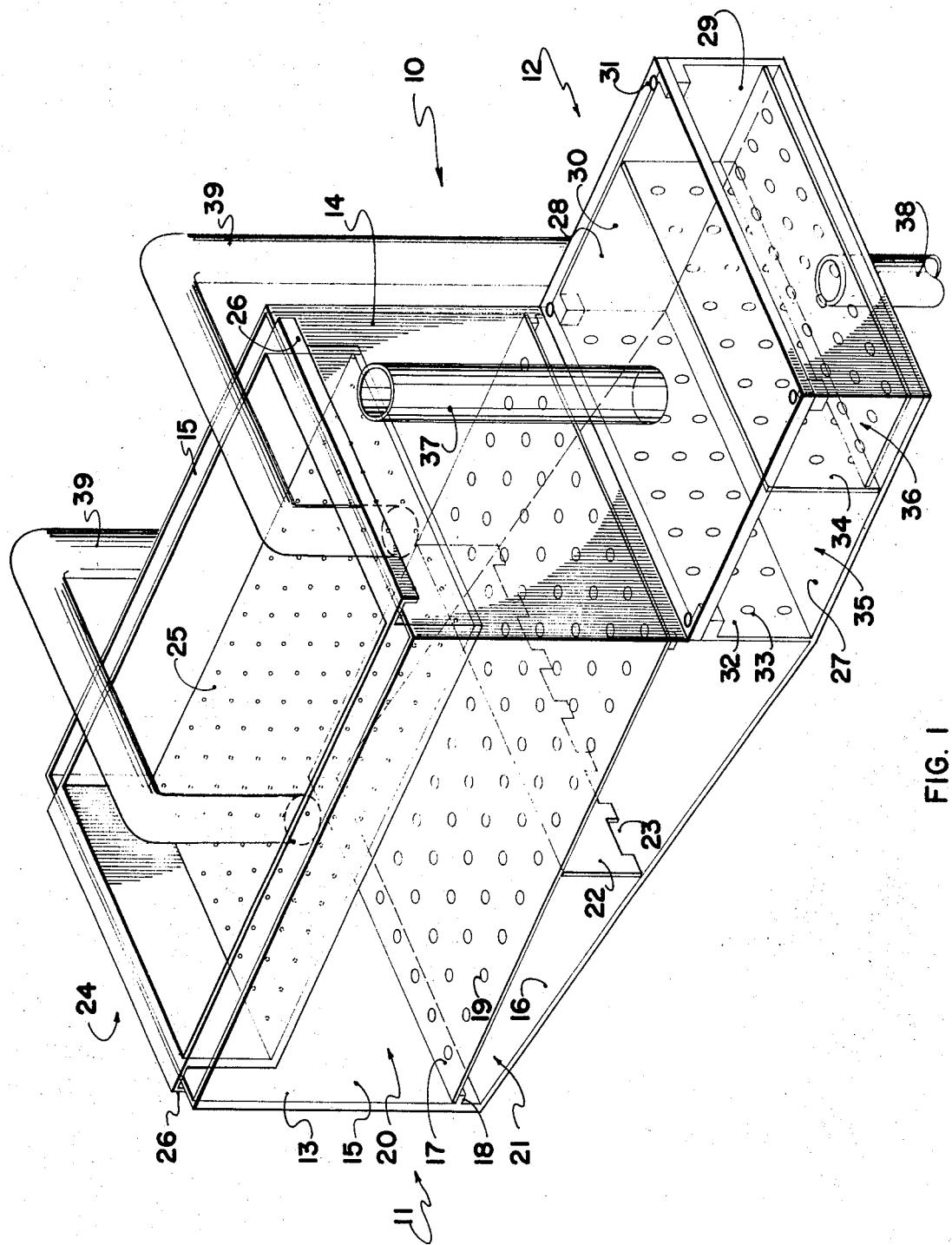
FIG. 1 is an isometric view of one embodiment of the invention.

Proceeding therefore to describe the invention in detail, reference should be made first to FIG. 1 which shows the filter collectively designated 10 and which consists of a main filter compartment collectively designated 11 and an after filter compartment collectively designated 12. In detail, the main filter compartment 11 includes end walls 13 and 14, side walls 15, and a sloping base wall 16.

A horizontally located partition or divider 17 rests upon ledges 18 adjacent the corners of the main filter compartment 11 and is spaced from the sloping base 16. This partition is perforated as at 19 as clearly shown and divides the main compartment into a filter bed portion 20 and a catch basin portion 21, the former being situated above the partition 17 and the latter being situated therebelow. A support divider 22 extends across the width of the catch basin and supports the partition in the center thereof and this support is apertured as at 23 to permit free passageway of water therethrough.

The main filter bed is situated upon the horizontal partition 17 but is not illustrated in the drawings for clarity. This filter bed consists of rough basalt rock chips or plastic chips which have the facility of supporting growth of aerobic micro-organism thereon. In absence of the above hardrock chips of the non-limestone category commonly known as "rocksplit" may be used.

Situated in the upper portion of the main compartment 11 is a drip pan 24 which consists of a finely perforated base 25 and surrounding side walls, the end walls of which are provided with hooked portions 26 so that the drip pan may be supported within the main compartment by the ends 26 overlying or hooking onto the upper edges of the end walls 14 thereof and in this embodiment, this open drip pan may be filled with glasswool (not illustrated) for primary filtration purposes.

The after filter compartment 12 extends from one end wall 14 of the main compartment but below the level of the horizontal partition 17. It consists of a base 27, side walls 28 and an outer end wall 29 together with a cover plate 30 secured by means of screws 31. The inner end wall 32 is perforated at 33 and acts as a partition between the catch basin portion 21.

A vertically situated perforated partition 34 divides the after filter portion into a first portion 35 and a second portion 36 and a standpipe 37 extends upwardly from the cover panel 36 over the first portion 35. This standpipe acts as an overflow control in the event that the assembly becomes flooded accidentally.

An exit tube 38 extends from the base of the second compartment 36 and is connected to an air lift (not illustrated) which returns filtered water from this compartment to the aquarium (not shown in this embodiment).

In operation, water from the aquarium is fed to the drip pan by means of siphon tubes 39 and the glass wool in the drip pan acts as a primary filter. The relatively fine apertures 25 within the base of the drip pan feed this water slowly to the filter bed situated between the drip pan and the horizontal partition 17 and this water trickles through the filter bed into the catch basin therebelow. From the catch basin it flows into the first compartment 35 of the after filter and then to the second compartment and into the outlet tube 38. If necessary, ion-exchange resin may be utilized in either of the after filter compartments but normally a glasswool type filter is used.

The main filter bed acts as aerobic bacterial growthbed for the reduction or organic matter to the nitrite-nitrate and mineral state and it is this nitrite-nitrate and mineral concentration which can be adjusted or removed in the after filter by the use of ion-exchange resins.

Figure 2:
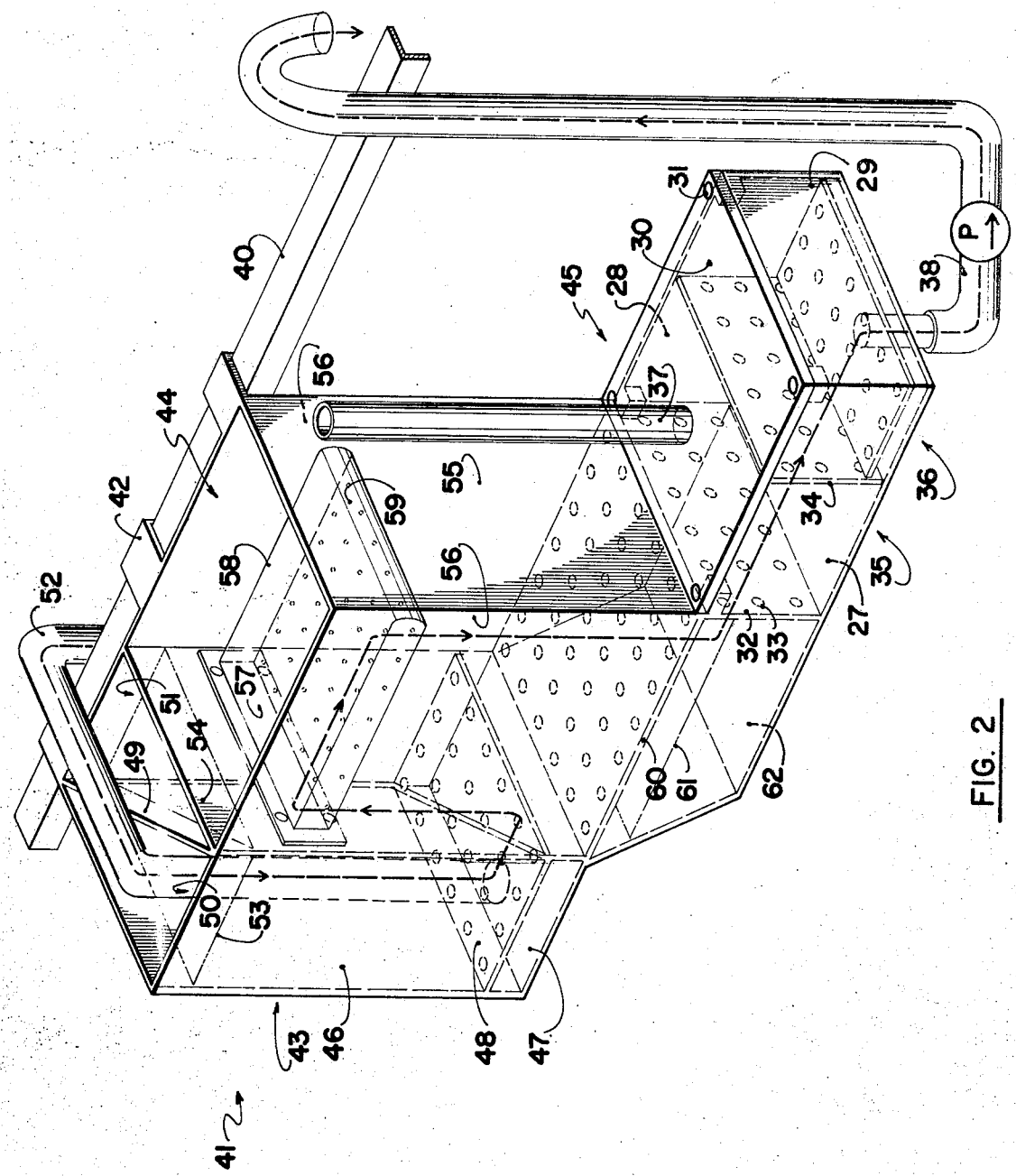
FIG. 2 is an isometric view of a further embodiment of the invention.

In the embodiment shown in FIG. 2, reference character 40 shows the upper edge of an aquarium with the filter collectively designated 41 hooked thereto by means of hook portions 42. In this embodiment, there is a pre-filter compartment collectively designated 43, a main filter compartment collectively designated 44 and an after filter compartment collectively designated 45. The entire filter is preferably constructed from clear plastic although this is not absolutely necessary and with respect to the drip pan, not desirable.

The pre-filter compartment is substantially square when viewed in plan and includes side walls 46 and a base 47. A horizontally situated perforated partition 48 spans the compartment just above the base and a diagonally situated imperforate partition 49 divides the pre-filter compartment into an intake portion 50 and an outlet portion 51. Both of these portions are normally filled with glasswool or similar prefiltering material and water from the aquarium is fed to the intake compartment 50 by means of a siphon tube 52. It filters downwardly through the glass fibre and through the perforated base or partition 48 to the space between the partition 48 and base 47 whereupon it then rises up into the outlet compartment 51 and stabilizes with a common water level indicated by reference character 53.

The main filter compartment includes one end wall 54 together with side walls 56 and the end wall 54 is provided with an aperture 57 adjacent the upper edge thereof communicating with the outlet compartment 51 of the pre-filter 43.

A closed drip pan 58 is secured by an open end around the aperture 57 so that water flows from the outlet compartment 51, through the outlet 57 into the drip pan container and this container is provided with a finely perforated base 59 so that water drips through the drip pan to the main filter bed situated between the drip pan and a horizontal perforated partition 60 spanning the main compartment at a point substantially level with the base 47 of the pre-filter compartment. This filter bed once again consists of "rocksplit" as hereinbefore described but has not been illustrated for clarity.

Due to the control exercised by the fine perforations within the base 59 of the drip pan, the water level of the main compartment is established and maintained by liquid transportation means through exit tube 38, and this level is indicated by the line 61, below the horizontal perforated partition 60, it being understood that the base 62 of the main compartment below this partition, forms a catch basin portion as hereinbefore described.

The after filter compartment 45 is similar in construction to the after filter portion or compartment 12 described in FIG. 1 so that similar reference characters have been given.

The filtered water passes through the perforated wall or partition 33 into the first compartment 35 of the after filter which once again may utilize ion-exchange resins if desired in a manner similar to that described previously.

The remainder of the construction is similar and it is not believed necessary to describe same further.

In this particular embodiment once again the main filter bed is unsubmerged by the creation of two independent water levels 53 and 61 in the same unit.

Purification is undertaken by oxidation and the work of aerobic bacteria situated on the surface of the rocksplit forming the filter bed.

From the siphon 52 the water flows into the inlet compartment 50 in a downward direction, passes through the perforated base 48 and is collected below this base. From there it rises through the perforated base on the other side of partition 49, into the outlet compartment 51 up to the "pressure level" 53 and from there it flows through aperture 57 into the drip pan 58.

This drip pan is in effect a flow regulation chamber inasmuch as it restricts the flow of water to a predetermined amount. The rate of flow depends on the design capacity of the filter and is in direct proportion to the biological capacity of the filter bed.

From the drip pan, the water trickles through the filter bed into the catch basin 62 where it collects and flows into the after filter 45. As mentioned this after filter is provided with two chambers so that de-ionizing resins can be used if desired. It is provided with a removable cover to which a riser pipe is attached to prevent spillage of the system if it should become flooded.

In larger models, a pump may be attached to the cover but in smaller models, the air lift is attached to the bottom of the second chamber so that by either means, the filtered water is returned to the aquarium.

It has been found that this filter can be used with salt water as well as fresh water with equal successful results. The device may be designed to suit aquariums or holding-tanks for fresh or salt water fish of any size. As long as the relationship of flow into the device, flow through the novel drip pan, size of the filter bed in relation to flow through the device, flow into the device and out of the device by means now or hereafter used for the movement and transport of liquids, can be maintained to the formula of the BOA (biological oxygen absorption) and the hereto necessary rate of flow. Basic rate of flow to size of filter bed, 0.5 – 1.2, a change in the BOA will require a change in this rate or the injection of air into the filter bed.

Various modifications may be constructed or performed within the scope of the inventive concept disclosed. Therefore what has been set forth is intended to illustrate such concept and is not for the purpose of limiting protection to any herein particularly described embodiment thereof.

I claim:

1. An externally situated aquarium filter assembly comprising in combination a main filter compartment and an after filter compartment, said main filter compartment including a first horizontally situated perforated partition dividing said compartment into a filter bed portion and a catch basin portion therebelow, a second perforated partition separating said catch basin portion from said after filter compartment, a drip pan situated on the upper side of said filter bed portion, said drip pan including a closed top, sides and one end, a finely perforated base and an open other end, means feeding water from the associated aquarium into said drip pan and means returning filtered water from said after filter compartment to said aquarium, said means feeding water from the associated aquarium including a pre-filter compartment, said pre-filter compartment including a third horizontal perforated partition spanning said pre-filter compartment adjacent the base thereof, and a vertical imperforate partition dividing the portion above said third perforated partition thereby dividing said portion into an entry portion and exit portion, communication being provided between said entry and exit portions beneath said third horizontal perforated partition, said pre-filter compartment being secured to one end wall of said main filter compartment, an aperture in said end wall adjacent the upper edge thereof, said drip pan communicating with said aperture by the said open other end of said drip pan, whereby water passes from said exit portion, through said aperture, and into said drip pan, and thence into said main filter compartment, to said after filter compartment, and then back to said aquarium.

2. The assembly according to claim 1 in which said after filter includes a substantially vertical perforated partition dividing said after filter into two portions, a riser pipe extending from one of said portions and said means returning filtered water to said aquarium extending from the other of said portions.

3. The assembly according to claim 1 in which said after filter compartment is secured to the end of said catch basin portion and is provided with a side an upper edge of which is substantially level with said first horizontal partition of said main filter.

4. The assembly according to claim 2 in which said after filter compartment is secured to the end of said catch basin portion and is provided with a side an upper edge of which is substantially level with said horizontal partition of said main filter compartment.

5. The assembly according to claim 2 in which said after filter compartment is secured to the end of said catch basin portion and is provided with a side an upper edge of which is substantially level with said horizontal partition of said main filter compartment.

* * * * *